P. MacGAHAN.
ELECTRICAL MEASURING INSTRUMENT.
APPLICATION FILED MAY 27, 1912.

1,194,202.

Patented Aug. 8, 1916.
2 SHEETS—SHEET 2.

WITNESSES:

INVENTOR
Paul MacGahan
BY
ATTORNEY

UNITED STATES PATENT OFFICE.

PAUL MacGAHAN, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,194,202.     Specification of Letters Patent.     Patented Aug. 8, 1916.

Application filed May 27, 1912. Serial No. 700,060.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and particularly to instruments that either indicate or record, or both indicate and record, the values of the electrical quantity being measured.

The object of my invention is to provide an electrical measuring instrument with simple and effective means whereby scale divisions thereof may be rendered more nearly uniform or equal than they are when no such device is employed.

Figure 1:
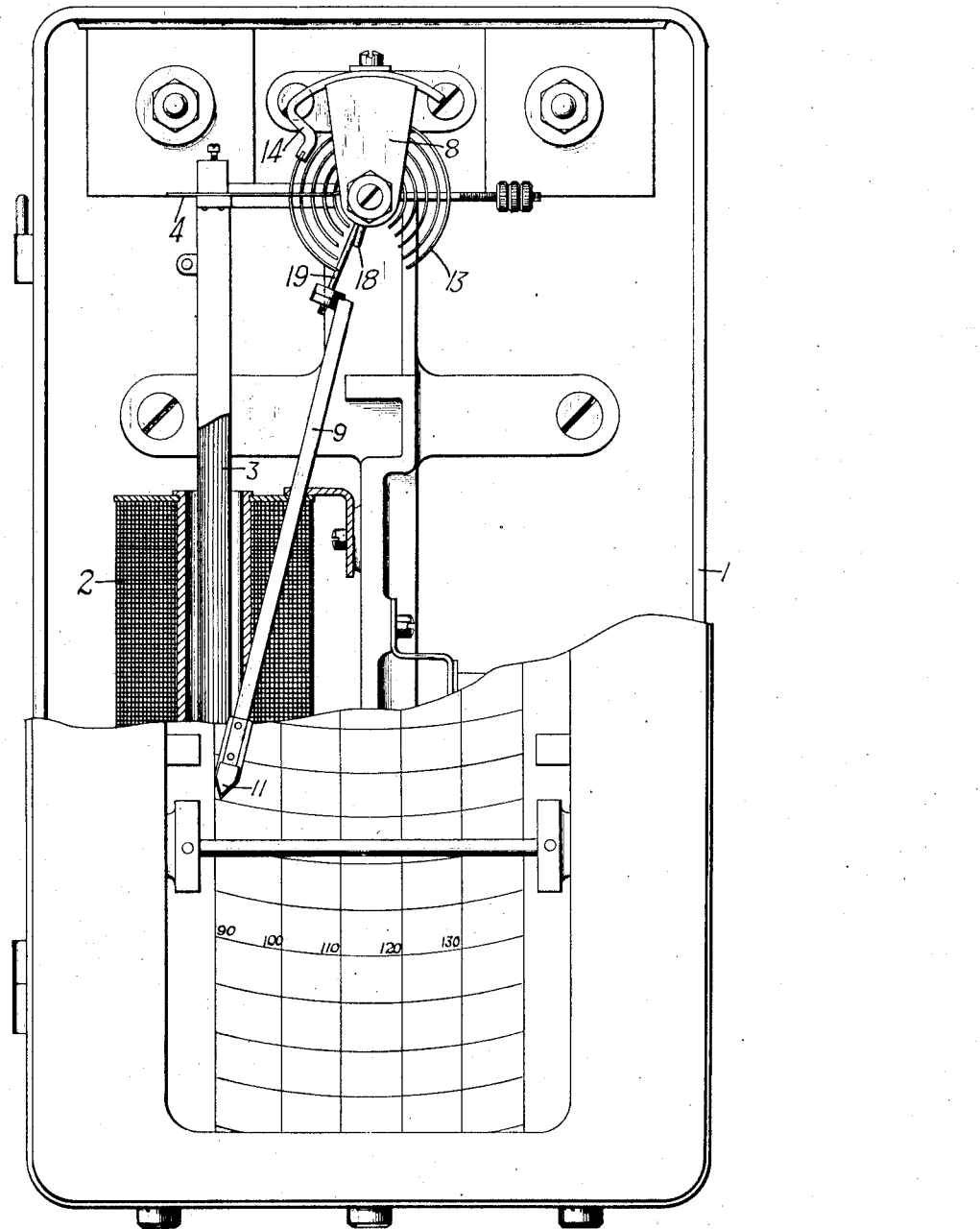
Figure 2:
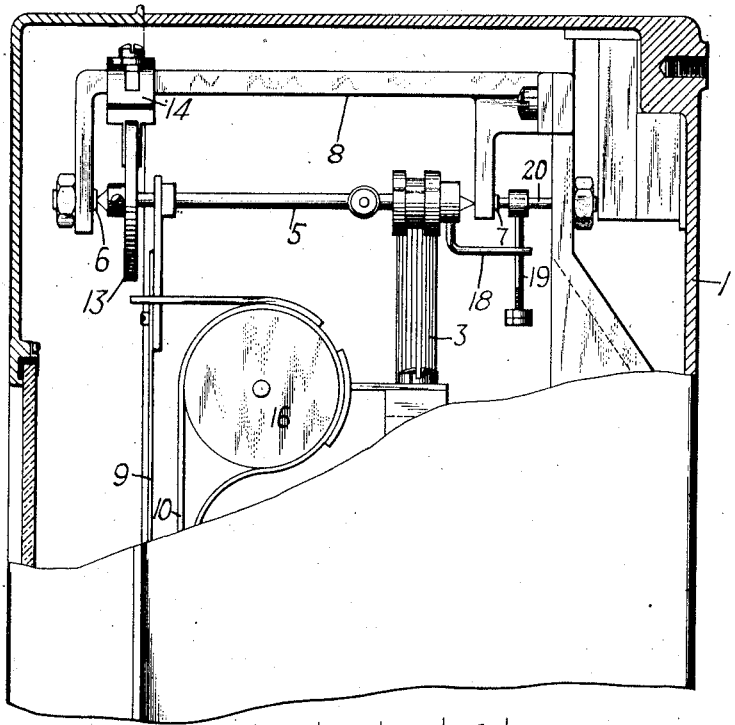
Figure 3:
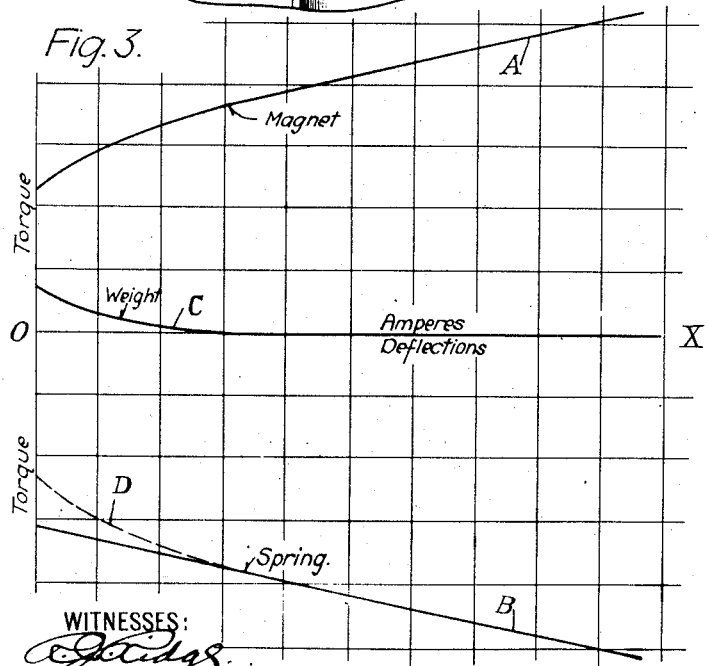

My invention is illustrated in the accompanying drawings, Figure 1 of which is a face view of an instrument constructed in accordance therewith, some of the front portions of the instrument being broken away to expose the rear portions thereof. Fig. 2 is a side view of the instrument, with a portion of the casing thereof broken away, and Fig. 3 is a diagram showing curves that are useful in explaining the operation of the instrument.

The instrument is provided with a casing 1 that both supports and incloses the operating parts comprising a solenoid 2, and a core 3 that is freely and longitudinally movable in the solenoid. The core 3 is suspended from one end of a slightly resilient arm 4, that is carried by a shaft 5, for which bearings 6 and 7 are provided in a bracket 8 constituting part of a frame that is secured to the casing 1. The arm 4 is extended beyond the shaft and is provided with a counter-weight that is adjustable longitudinally thereof. The shaft 5 also carries a downwardly extending pointer or arm 9 that moves over a platen 10 and is provided at its lower end with a pencil or pen 11, or other suitable marking device. The shaft 5 and the arm 9 are normally retained in the positions indicated by means of a spiral spring 13, one end of which is secured to the shaft and the other end of which is secured to an adjustable member or post 14, the said spring being under an initial strain in order to adapt the instrument to make indications only when the measured quantity exceeds a predetermined value. As the core 3 is drawn downwardly into the solenoid 2, the pointer 9 is moved from left to right and the spring 13 is placed under an increasing degree of torsion in opposition to the pull exerted upon the core 3 by the solenoid 2, the pointer remaining stationary when the pull of the solenoid upon the core 3 balances the torsion of the spring 13. However, the pointer 9 will not be moved from its initial position until the initial strain of the spring 13 has been overcome by the pull of the magnet.

The instrument is provided with a substantially cylindrical sheet metal support or receptacle 16 for a roll of record paper upon which the measurements or indications are recorded, the platen 10 being an extension of the said support or receptacle. The record paper is provided with longitudinal lines corresponding to the unit divisions of the quantity measured by the instrument, and with curved transverse lines having radii corresponding to the length of the pointer 9 and spaced apart distances representing or corresponding to certain predetermined periods of time. The record paper is moved longitudinally by any suitable means (not shown) at a uniform rate, so that the record made thereon by the marking device 11 will permit of ascertaining the measurement made by the instrument at any particular time. The position of the pointer with respect to the longitudinal lines upon the record strip also affords an indication of the instantaneous value of the quantity being measured at the time of inspection of the instrument, and, if desired, the instrument may be provided with a stationary curved scale adjacent to the end of the pointer or to a part carried thereby.

Instruments of the kind herein set forth have the peculiar characteristic that a unit change in the current causes a greater change of pull to be exerted upon the magnet core when the core and the pointer are adjacent to their initial or normal positions than when in their succeeding positions. The result is that if no means are provided for modifying this condition, the lower scale divisions are longer than the higher scale divisions.

In the diagram of Fig. 3, curve A represents the relations between the amperes of current in the solenoid and the torque or pull exerted by the solenoid upon the movable element of the instrument, and curve B represents the relations between the torques exerted upon the spring 13 and the deflections of the spring produced by the said torques. It will be noted that the two curves differ somewhat from each other and particularly at the ends adjacent to the vertical axis of the curves. In order that the deflections of the movable member of the instrument may be equal for the same changes in the current traversing the solenoid, the curves A and B should be of substantially the same form. In order to obtain this result, and to thereby provide a scale for the instrument having divisions of substantially uniform length, I have provided the shaft 5 with an L-shaped arm 18 that, at a predetermined point in its arc of movement, is adapted to engage and carry forward another substantially vertical arm 19 that is suspended from a short shaft 20 in substantial alinement with the shaft 5, but is pivoted and capable of movement independently thereof. The arm 19 is threaded and is provided with a nut serving as a weight that may be adjusted longitudinally thereof in order to regulate its effect upon the operation of the instrument.

The arm 19 is moved from its vertical position, from right to left, as the shaft 5 and the arm 18 are rotated in a clockwise direction, that is, as the pointer 19 is returned by the spring 13 toward its initial position. The action of gravity upon the weighted arm 19, therefore, serves to assist the solenoid 2 and to oppose the spring 13 through a part of the arc of movement of the pointer 9. The effect of the weighted arm upon the instrument is to cause the deflections of the pointer to be of nearly uniform length for unit changes of current in the solenoid over all parts of the scale. This will be readily understood by referring again to the diagram of Fig. 3 in which the curve C represents the relation between the torques required to move the weighted arm 19 from a vertical position and the deflections produced by the said torques. As the weighted arm acts in opposition to the spring 13 and supplements the torque or pull of the solenoid, it modifies the resultant torque acting in opposition to the pull of the solenoid as shown by the broken line portion D of the curve B. This resultant curve is of substantially the same shape as the curve A, and, consequently, the deflections of the pointer are in substantial proportion to the currents traversing the solenoid, and the scale of the instrument also has divisions of substantially uniform length.

I claim as my invention:

1. In an electrical measuring instrument, the combination with a movable member, and means for actuating the same, of means for yieldingly opposing the said actuating means, and adjustable gravity-actuated means for supplementing the said actuating means, said gravity-actuated means being disconnected from the movable member under predetermined conditions.

2. In an electrical measuring instrument, the combination with a movable member, and means for actuating the same, of means for yieldingly opposing the said actuating means, and a freely movable gravity-actuated means adapted to be engaged by the movable member to supplement the actuating means under predetermined conditions.

3. In an electrical measuring instrument, the combination with a movable member, and means for actuating the same, of means under initial strain for yieldingly opposing the said actuating means, and an independently operative gravity-actuated means having an inactive normal position but serving to supplement said actuating means when moved from its normal position.

4. In an electrical measuring instrument, the combination with a movable member, and means for actuating the same, of means under initial strain for yieldingly opposing the said actuating means, and a gravity-actuated means for supplementing said actuating means but disconnected from it during a predetermined portion of its movement.

5. In an electrical measuring instrument, the combination with a movable member, and means for actuating the same, of means for yieldingly opposing the said actuating means, and an independently pivoted gravity-actuated means for supplementing the said actuating means through a portion only of the range of movement of the movable member.

6. In an electrical measuring instrument, the combination with a movable member and means for actuating the same, of means for yieldingly opposing the said actuating means, and an independently pivoted and normally vertical arm adapted to supplement the actuating means.

7. In an electrical measuring instrument, the combination with a movable member and means for actuating the same, of means for yieldingly opposing the said actuating means, and an independently pivoted means for supplementing the said actuating means through a portion only of the range of movement of the movable member.

8. In an electrical measuring instrument, the combination with a movable member, and means for actuating the same, of means for yieldingly opposing the said actuating means, a normally vertical pivotally suspended arm, and means carried by the movable member for moving the said arm from the vertical position to supplement the actuating means.

9. In an electrical measuring instrument, the combination with a movable member, and means for actuating the same, of means for yieldingly opposing the said actuating means, a normally vertical pivotally suspended arm and means carried by the movable member for moving the said arm from the vertical position beginning at a predetermined point in the path of movement of said member to supplement the actuating means.

10. In an electrical measuring instrument, the combination with a solenoid, a core movable into and out of the same, and means for yieldingly opposing the movement of the core into the solenoid, of an independently pivoted and normally vertical arm adapted to assist movement of the core into the solenoid.

11. In an electrical measuring instrument, the combination with a solenoid, a core movable into and out of the same, and means under initial strain for yieldingly opposing movement of the core into the solenoid, of an independently pivoted means adapted to assist movement of the core into the solenoid.

12. In an electrical measuring instrument, the combination with a solenoid, a core movable into and out of the same, and means under initial strain for yieldingly opposing movement of the core into the solenoid, of an independently pivoted means adapted to assist movement of the core into the solenoid during a relatively small part of the movement thereof.

13. In an electrical measuring instrument, the combination with a solenoid, a core movable into and out of the same, and means under initial strain for yieldingly opposing movement of the core into the solenoid, of an independently pivoted arm, and means operatively connected to the said movable core for engaging the pivoted arm under predetermined conditions.

14. In an electrical measuring instrument, the combination with a solenoid, a core movable into and out of the same, and means under initial strain for yieldingly opposing movement of the core into the solenoid, of an independently pivoted arm, and means for turning the pivoted arm upon its pivot as the core moves out of the solenoid.

In testimony whereof, I have hereunto subscribed my name this 11th day of May, 1912.

PAUL MacGAHAN.

Witnesses:
H. B. TAYLOR,
A. W. COPLEY.